F. G. RILEY.
APPARATUS FOR BOTTLING LIQUIDS.
APPLICATION FILED NOV. 18, 1907.

932,415.

Patented Aug. 24, 1909.
6 SHEETS—SHEET 3.

Witnesses:

Inventor:
Frederic George Riley
by Henry D. Williams
Atty.

F. G. RILEY.
APPARATUS FOR BOTTLING LIQUIDS.
APPLICATION FILED NOV. 18, 1907.

932,415.

Patented Aug. 24, 1909.
6 SHEETS—SHEET 4.

Witnesses:
Farnum F. Dorsey
Bernard Cowen

Inventor:
Frederic George Riley
by Henry D. Williams
Atty.

F. G. RILEY.
APPARATUS FOR BOTTLING LIQUIDS.
APPLICATION FILED NOV. 18, 1907.

932,415.

Patented Aug. 24, 1909.
6 SHEETS—SHEET 5.

Witnesses:
Farnum F. Dorsey

Inventor:
Frederic George Riley
by Henry D. Williams
Atty.

F. G. RILEY.
APPARATUS FOR BOTTLING LIQUIDS.
APPLICATION FILED NOV. 18, 1907.

932,415.

Patented Aug. 24, 1909.
6 SHEETS—SHEET 6.

Witnesses:
Farnum F. Dorsey
Bernard Cowen

Inventor:
Frederic George Riley
by Henry D. Williams
Atty.

UNITED STATES PATENT OFFICE.

FREDERIC GEORGE RILEY, OF LONDON, ENGLAND.

APPARATUS FOR BOTTLING LIQUIDS.

932,415.  Specification of Letters Patent.  Patented Aug. 24, 1909.

Application filed November 18, 1907. Serial No. 402,624.

*To all whom it may concern:*

Be it known that I, FREDERIC GEORGE RILEY, a subject of the King of Great Britain, residing at 256 South Lambeth road, London, S. W., in the county of Surrey, England, have invented certain new and useful Improvements in Apparatus for Bottling Liquids, of which the following is a specification, reference being had therein to the accompanying drawing.

My invention relates particularly to bottle-filling machines of the type in which bottles are inserted in suitable holding devices and engaged by filling devices controlled by a valve by which the emission of air and the admission of liquid are controlled.

One object of the invention is to provide such a machine with automatic means for interrupting its operation in the absence of a bottle from the holding and filling devices.

Another object of the invention is to so arrange the machine that it will fail to operate in the absence of suitable adjustment and lubrication of the valve.

Another object of the invention is to provide a valve of improved form adapted for operation in connection with liquids of corrosive character or under high pressure.
To the foregoing objects and other objects of the invention which will be noted in connection with the description of the illustrated embodiment of the invention, the invention consists in the bottle-filling machine hereinafter described, as defined in the appended claims.

In the accompanying drawings
Figure 1 is a side elevation, partly in section, of a bottle-filling machine embodying the present invention.
Fig. 1$^a$ is an enlarged view of the ball race H$^4$.
Figs. 9 and 10 are sectional detail views of the drainage outlet and receptacle.

The illustrated embodiment of the invention is a power-driven rotary machine adapted to operate on several bottles at once. The bottles are placed successively upon, and removed from, a rotary bottle carrier by the operator, while the filling operations are performed automatically.

The bottle carrier is journaled on a column B, and comprises a sleeve C resting on a ball-race B$^1$, and a broad base C$^1$ which supports the bottle-holding devices and is formed to constitute also a pan to catch drainage from the bottle-filling devices.

The bottles are supported on the bottle carrier by bottle holders comprising bottle seats D$^2$, in which the bottoms of the bottles rest, mounted on slides D$^1$ which move in slide boxes D on the bottom of the bottle carrier. The bottle holders are normally held in operative position by compression springs D$^3$ which are mounted within the slides and engage pins D$^4$ fixed in the bottle carrier and passing through transverse slots in the slides. These springs tend to move the bottle holders inward so as to engage and hold the bottles.

Figure 7:
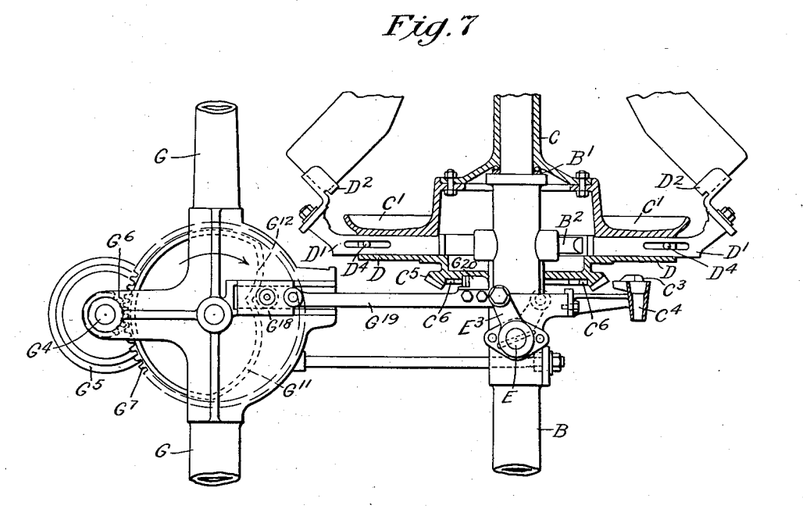
Fig. 7 is a similar view to Fig. 4 but taken from the opposite direction.
Figure 8:
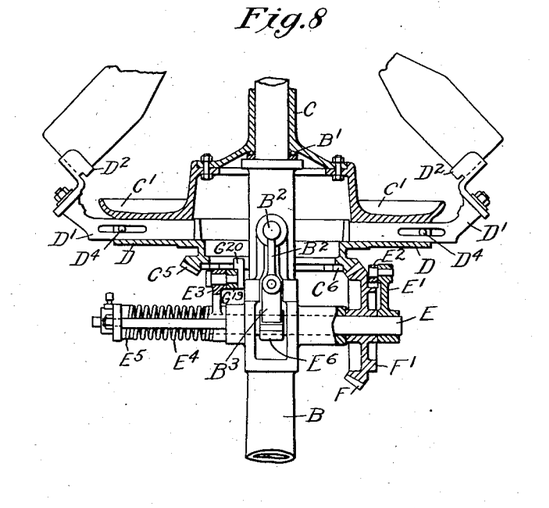
Fig. 8 is a vertical section of the lower portion of the bottle carrier and its actuating mechanism, looking from right to left in Fig. 7.

An intermittent rotary movement is imparted to the bottle carrier by mechanism comprising a bevel gear C$^5$ fixed to the bottom of the bottle carrier and a coöperating bevel pinion F, which is loosely journaled on a horizontal shaft E. The shaft E is journaled in bearings in column B, and has fixed at one end an arm E$^1$ carrying a pawl E$^2$ engaging a ratchet F$^1$ fixed to pinion F. The other end of shaft E carries an arm E$^3$ which is connected, by a link G$^{19}$, with a cam slide G$^{18}$ carrying a cam roll engaging a rotary cam G$^{12}$. Cam G$^{12}$ is mounted on a countershaft G$^9$ journaled in a column G on the bed-plate A of the machine, and the countershaft and the cams carried thereby are actuated by connections with a suitable source of power, through a change-speed mechanism comprising gears G$^7$ and G$^6$, pulley shafts $G^4$ and $G^1$ journaled on column G, and cone pulleys $G^3$ and $G^5$ connected by a belt. Shaft $G^1$ is rotated by a pulley $G^2$ connected with a source of power. As cam $G^{12}$ is rotated by the means described it acts once in each revolution to move slide $G^{18}$, link $G^{19}$, and arm $E^3$ to the right (Fig. 7), so that rock shaft E moves arm $E^1$ in the same direction and pawl $E^2$ moves idly over rachet $F^1$.

The return movement of rock shaft E and the parts carried thereby, by which the bottle carrier is rotated, is not positive in character but is caused by a torsion spring $E^4$, which is fixed, at one end, to the hub of arm $E^3$ and, at the other end, to a block $E^5$ adjustably mounted on the frame of the machine. This spring tends constantly to rotate the rock shaft in the direction to cause pawl $E^2$ to rotate ratchet $F^1$ and gear F, and thus, when the depressed portion of cam $G^{12}$ engages the cam roll the spring acts to impart a partial rotation to the bottle carrier.

After each movement of the bottle carrier the operator removes a filled bottle and substitutes an empty one, and to facilitate this operation automatic means are provided for moving the bottle-holder outward to release the filled bottle from the filling devices. For this purpose a pusher $B^2$ comprising a horizontal rod and a depending arm is mounted to slide horizontally in column B opposite the position occupied by each slide $D^1$ when it assumes the position at which the bottle is replaced. A rod $G^{14}$ passes loosely through the pusher, having its movement with respect thereto limited by a collar $G^{17}$ and a sleeve $G^{15}$, and a compression spring $G^{16}$ tends to maintain collar $G^{17}$ in engagement with the pusher. Rod $G^{14}$ is fixed to a cam slide $G^{13}$, which carries a cam roll which is engaged alternately by cams $G^8$ and $G^{10}$ on countershaft $G^9$. Cam $G^{10}$, acting through rod $G^{14}$ and sleeve $G^{15}$, moves pusher $B^2$ to engage and push back the bottle-holder slide opposite it, and the pusher also enters the slide box so as to prevent accidental rotation of the bottle carrier. When cam $G^{10}$ releases the parts, by its continued rotation, the pusher is withdrawn clear of the slide by the action of cam $G^8$, while the slide is retracted by its spring to grip the bottle.

To prevent rotation of the bottle carrier when the operator fails, from any cause to place a bottle of suitable size in the bottle holder when it is released, as above described, the depending arm of pusher $B^2$ is provided with a finger $B^3$ adapted to engage a lug on a collar $E^6$ fixed to rock-shaft E. In the normal retracted position of the pusher these parts do not engage, but in the absence of a bottle of proper length the slide $D^1$ is retracted by its spring beyond its bottle-gripping position, so that it engages pusher $B^2$, compresses the light spring $G^{16}$, and causes the finger to engage the lug. By these means movement of rock-shaft E by spring $E^4$ is prevented, and the bottle carrier is not rotated. The continued operation of the cams $G^8$ and $G^{10}$ now causes the bottle holder to be repeatedly released, but the operations of the machine are otherwise interrupted, until the operator inserts a bottle.

To arrest the bottle carrier positively at the end of each partial rotation a ratchet $C^6$ is formed on the bottle carrier, and link $G^{19}$ is provided with a detent $G^{20}$ which engages the ratchet at the end of the return stroke of arm $E^3$ coincident with the rotation of the bottle carrier.

The bottle holders hold the mouths of the bottles in engagement with the bottle-filling devices. Each bottle filling device comprises a filling tube $H^9$ which enters the bottle neck to the point to which the bottle is to be filled and is provided with passages for the admission of liquid and the escape of air. A washer $H^{10}$ of rubber surrounds the filling tube and forms a tight joint with the bottle mouth.

Figure 12:
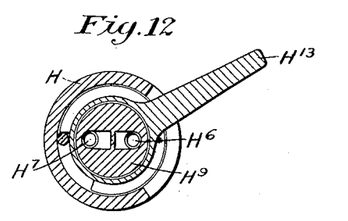
Figs. 12 and 13 are transverse sections through the filling device, showing the hand valve in open and closed positions, respectively.
Figure 13:
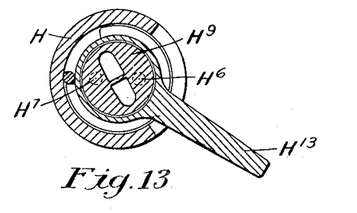

The passages in the filling tube register with inlet and outlet passages $H^6$ and $H^7$, respectively, in a shell H, which is fixed to the upper end of sleeve C. In order that these passages may be closed in the absence of a bottle from any one of the filling devices, as in case of the bursting of a bottle, the filling tube $H^9$ is formed to constitute a valve, having a flat extremity resting against a seat $H^8$ in the shell H. The tube is maintained against this seat by a threaded adjustable sleeve $H^{11}$ acting through a ball bearing $H^{12}$, and a lever $H^{13}$ is fixed to the filling tube. By means of this lever the tube may be turned from the position of Fig. 12, in which the ports in the tube and the valve seat $H^8$ register, to the position of Fig. 13, in which the passages are closed.

The filling operation is controlled by a plug valve $H^1$ governing the passages in the shell H. This valve is ground to fit a recess in the shell, and is prevented from rotating with the latter by a stem $H^2$ which has a flattened end extending into a slot in the top of column B.

The valve is maintained against its seat by a spring $H^3$ which bears, at its upper end, against shell H and, at its lower end, against a ball-race $H^4$ on stem $H^2$. To prevent undue wear of the valve, however, the action of the spring is limited and controlled by a ball bearing interposed between a flange $H^1$ on the valve and an adjustable threaded ring $H^5$ on shell H. By means of ring $H^5$ the engagement of the valve with its seat may be nicely regulated so as to maintain a tight joint without undue friction.

The liquid with which the bottles are filled is contained in a cylindrical reservoir J mounted on the valve H¹. This reservoir also receives the air and gas discharged from the bottles in the course of the filling operation. The reservoir is connected with a suitable source of liquid supply by J⁸, and the depth of liquid in the reservoir is controlled by a float J² connected with a relief valve J³, which operate to allow air and gas to escape from the reservoir through a cock J⁴ when the liquid falls below a pre-determined level, and the release of the air and gas permits the entrance of a fresh supply of liquid.

Figures 1, 1A:
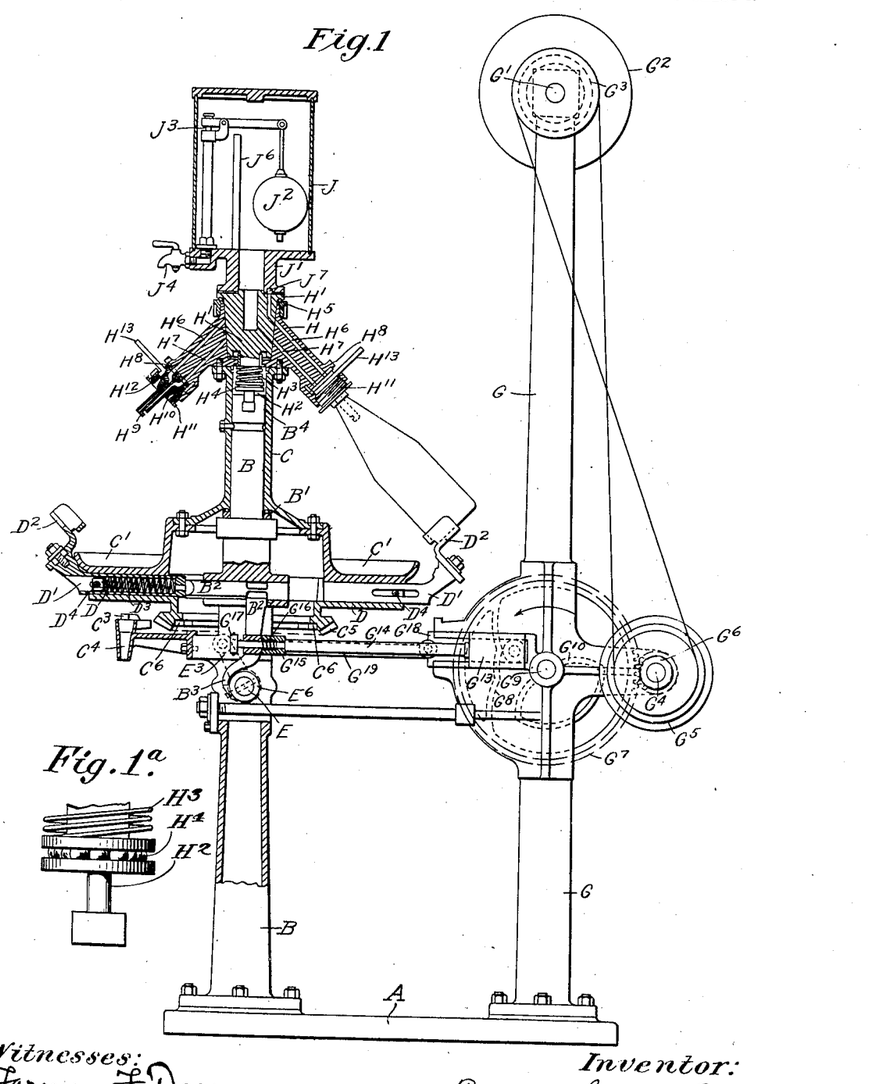
Figure 2:
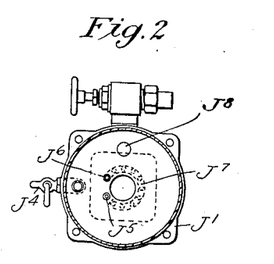
Fig. 2 is a sectional plan view of the filling reservoir.
Figure 3:
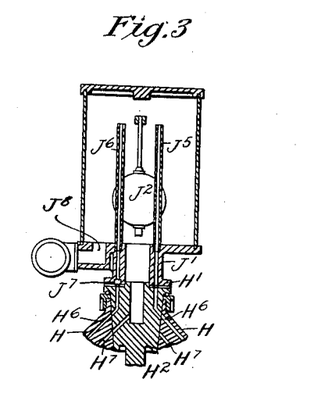
Fig. 3 is a vertical section of the same.
Figure 4:
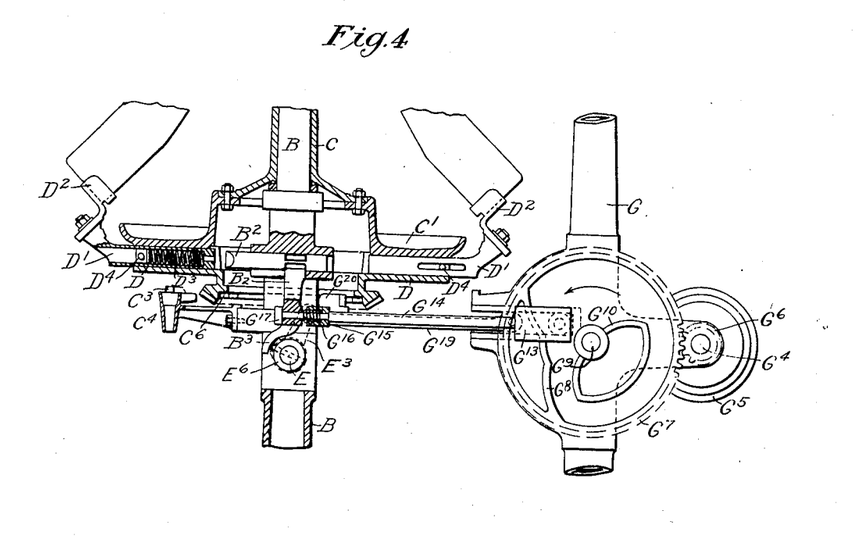
Fig. 4 is a partial sectional elevation of the machine, showing the automatic stop in inoperative position.
Figure 5:
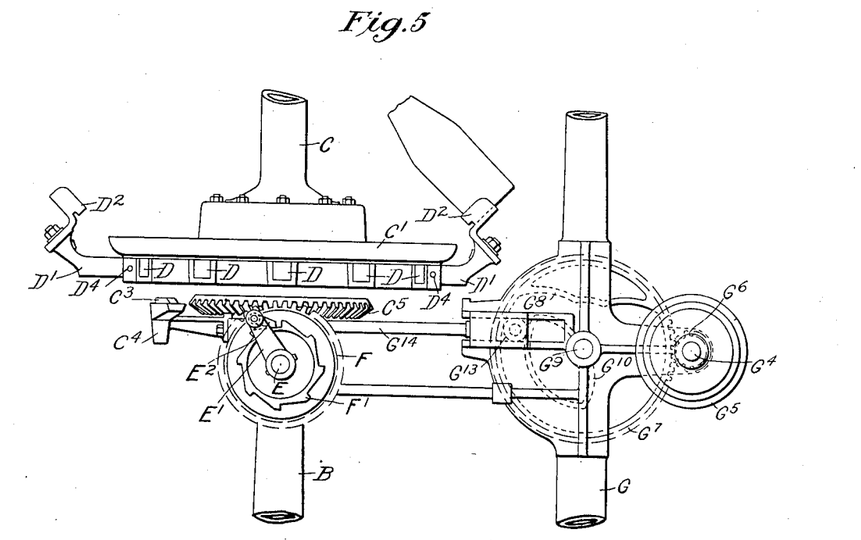
Fig. 5 is a side elevation of the lower portion of the machine viewed in the same direction as Fig. 1.
Figure 6:
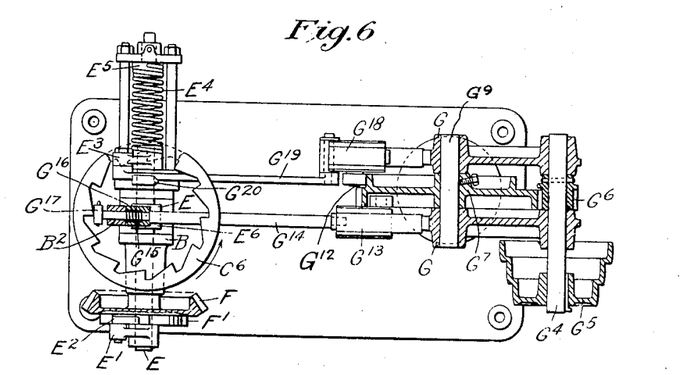
Fig. 6 is a sectional plan view of the mechanism for actuating the bottle carrier.

A central passage in the valve, connected with the bottom of the reservoir, communicates, through a lateral port, as shown in Fig. 3, with the inlet passage H⁷, at suitable times in the operation of the machine, to admit liquid to the bottles, and the outlet passages H⁶ register with ports in the valve which unite, as shown in Figs. 2 and 3, in an annular passage J⁷. At one end of this passage is a riser tube J⁶ which rises above the level of the liquid in the reservoir. A second riser J⁵ comes first into connection with each outlet passage, to charge the bottle with gas under pressure before the flow of liquid begins. In Fig. 3 these parts are not shown with strict accuracy, but, for purposes of illustration, the tubes are shown as if both lying in the section plane.

During the filling operation, as the liquid enters through the inlet passages the air and gas contained in the bottles escape through the outlet passages and the tube J⁶. An advantage of the arrangement by which the outlet passages are united in the common passage J⁷ lies in the fact that the foam resulting from the filling of the bottles is removed from the bottles already filled by the passage of the air escaping, through this common passage, from the bottles in process of filling.

At the position in which the bottles are removed and replaced both the inlet passage and the outlet passage of the filling device are out of communication with the reservoir, so that nothing escapes during the exchange of bottles.

Figure 9:
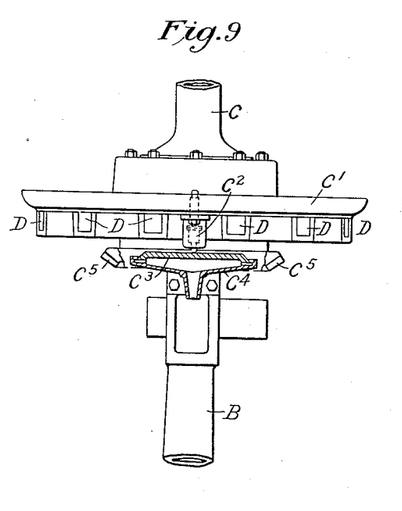
Figure 10:
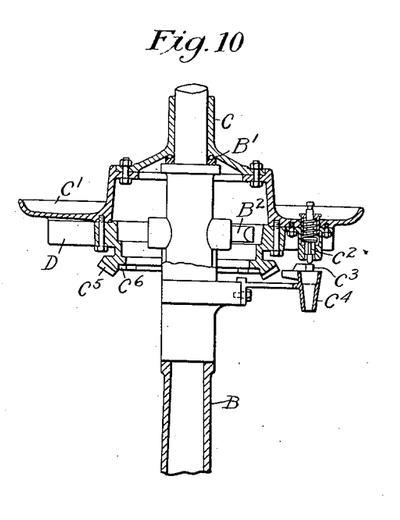
Figure 11:
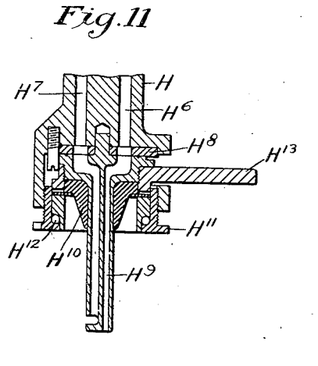
Fig. 11 is a longitudinal section, on an enlarged scale, of one of the filling devices.
Figure 14:
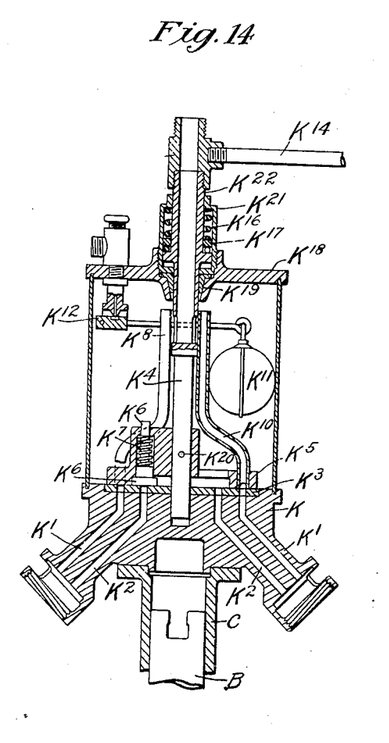
Fig. 14 is a vertical section through the upper portion of a modified form of the machine.
Figure 15:
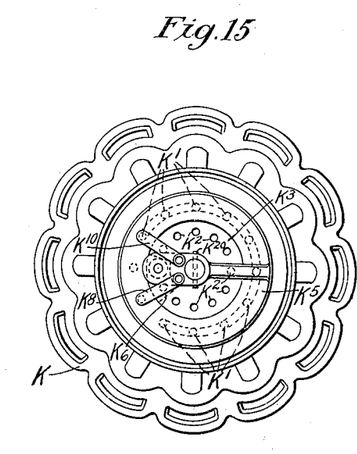
Fig. 15 is a plan view of the valve and valve chamber in the modified form of the machine.
Figure 16:
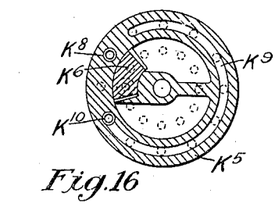
Fig. 16 is a sectional plan of the modified valve seen from below.

In order to remove liquid collecting in the pan at the bottom of the bottle carrier, the pan is provided with an outlet controlled by a spring-pressed valve C² (Figs. 9 and 10), which is normally closed. Fixed to column B is a drainage receptacle C⁴, which is provided with a cam surface C³. When, in the rotation of the bottle carrier, the valve passes over the drainage receptacle this cam engages the stem of the valve and raises the valve from its seat, and the drainage escapes into the receptacle, from which it is conducted by a pipe or other suitable means.

Where fluids of corrosive character or fluids under great pressure are to be handled the modified form of filling valve shown in Figs. 14, 15 and 16 is preferably used. Here the valve K⁵ is flat and rests on a flat seat K³ of incorrodible material located at the bottom of the reservoir, which forms a valve chamber. The bottom of the reservoir is formed by a head K which is fixed to the top of sleeve C and carries the filling devices. The valve is ring-shaped in general form, and is centered upon a rod K⁴, to which it is fixed by a pin K²⁰. The rod is fixed to the lower end of a fluid supply pipe K²² which enters the top K¹⁸ of the reservoir through a packing joint K¹⁹. Rotation of this pipe is prevented by a rod K¹⁴ which is fixed to the supply pipe and to any suitable fixed object, and thus the valve is prevented from rotating in unison with the valve seat. The lower end of the rod K⁴ loosely enters a recess in the head K and thus the valve member is centered upon its seat.

The outlet passages K¹ are controlled by the annular portion of the valve, which is provided with a common outlet passage K⁹ serving the same purpose as the passage J⁷ in the form of valve previously described, and a riser tube K¹⁰ connects this passage with the upper portion of the reservoir.

The inlet passages K² are controlled by an independently-movable valve member K⁶, which is pressed against the valve seat by a spring K⁷. This arrangement is formed to operate more reliably than a valve in which the inlet controlling portion is integral with the annular outlet controlling portion.

A second riser K⁸ comes first into communication with each bottle before the inlet port is opened, so that the bottle is charged with gas or air under pressure before the filling operation begins, and the creation of foam is thereby reduced. In Fig. 14 the risers are shown somewhat out of their proper positions, for clearness of illustration.

The supply of liquid to the reservoir is controlled by a float K¹¹ and an air-escape valve K¹², as in the first described form of the invention.

The valve mechanism above described is so formed and constructed that it is substantially balanced against fluid pressure tending to force it against its seat. The pressure tending to force the inlet pipe from the reservoir opposes the pressure tending to force the valve against its seat, owing to the mechanical connection between the valve and the pipe, and the diameter of the pipe is such that these pressures substantially balance each other, so that whatever the pressure in the reservoir may be the pressure of the valve against its seat is not substantially affected. To maintain the valve against its seat with a uniform sufficient pressure a spring K¹⁶, surrounding the supply pipe K²², is arranged to bear, at its lower end, against a ball bearing $K^{17}$ mounted on the supply pipe, while its upper end is supported by a sleeve $K^{21}$ fixed to the top of the reservoir and the ordinary elasticity of the supply pipe and the rod $K^{14}$ is sufficient to permit the minute movement of the valve in accommodating itself to its seat under the influence of the spring. This arrangement insures a minimum friction and wear between the valve and its seat under all varying conditions of working.

The use of yielding means such as the spring $E^4$, for rotating the bottle carrier, simplifies the construction by which the machine is made to stop automatically in the absence of a bottle, since it permits the movement of the bottle carrier to be arrested without disconnecting it from the power mechanism. The yielding operation of the bottle carrier has the further advantage that it acts as a safety device to prevent injury to the filling valve, for upon any undue increase in friction in the valve, due to failure of the operator to adjust the valve or to any other cause, the increased resistance will prevent the rotation of the bottle carrier, thereby calling attention to the defect before injury to the valve results.

It will be obvious that various modifications may be made in the embodiment of my invention herein described and illustrated in the accompanying drawings within the nature and scope of the invention as defined in the following claims.

I claim:—

1. A bottle-filling machine comprising a bottle-filling device engaged by the mouth of the bottle, a valve controlling the operation of the bottle-filling device, a bottle holder movable to engage and disengage the bottom of the bottle, mechanism for actuating the valve, and connections between the bottle holder and said mechanism constructed and operating to prevent the actuation of the valve in the absence of a bottle from the filling device and the bottle holder.

2. A bottle-filling machine comprising a rotatably-mounted bottle carrier, a filling device and a bottle holder mounted on the bottle carrier, a valve for controlling the operation of the filling device connected with the bottle carrier and actuated by the rotation thereof, means for imparting an intermittent rotation to the bottle carrier, and means connected with the bottle holder constructed and operating to prevent such rotation in the absence of a bottle.

3. A bottle-filling machine comprising a rotatably-mounted bottle carrier formed and constructed to hold a plurality of bottles, bottle-filling devices engaging the bottles on the bottle carrier, said devices being inoperative with respect to a bottle in one position, yielding means operating regularly to impart a partial rotation to the bottle carrier, and means operating automatically to arrest such rotation in the absence of a bottle in said position.

4. A bottle-filling machine comprising a rotatably-mounted bottle carrier, a bottle-filling device, a valve controlling the operation of the filling device and connected with and actuated by the bottle carrier in its rotation, a spring for imparting an intermittent rotation to the bottle carrier, a bottle-engaging device, a stop connected therewith and operating to prevent the rotation of the bottle carrier in the absence of a bottle.

5. A bottle-filling machine comprising a movably-mounted bottle carrier, bottle-filling means controlled in their operations by the movement of the bottle carrier, and yielding power-actuated means for imparting an intermittent movement to the bottle carrier.

6. A bottle-filling machine comprising a rotatably-mounted bottle carrier, bottle-filling means including a valve connected with and actuated by the bottle carrier in its rotation, a spring for rotating the bottle carrier, and means for compressing the spring intermittently.

7. A bottle-filling machine comprising a rotatably-mounted bottle carrier, a bottle-filling device, a valve controlling the operation of the bottle-filling device and connected with and actuated by the bottle carrier in its rotation, a bottle holder movably mounted on the bottle carrier, automatic means for imparting an intermittent rotation to the bottle carrier, and automatic means for moving the bottle holder to release the bottle after the completion of the filling operation.

8. A bottle-filling machine comprising a bottle-filling device, a valve having relatively rotating members and controlling the operation of the bottle-filling device and constructed and arranged to be substantially balanced against the pressure of the fluids in the filling device, and means for maintaining the valve against its seat with a uniform pressure.

9. A bottle-filling machine comprising a bottle-filling device, a balanced valve controlling the operation thereof, a valve seat, means for maintaining the valve with a substantially uniform pressure against its seat, and yielding means for relatively rotating the valve and the valve seat with a predetermined degree of force.

10. In a bottle-filling machine, a filling valve provided with a body portion engaging and controlling a plurality of air outlet ports, an independent member controlling a plurality of filling ports, and a spring connecting said body portion and independent member.

11. A bottle-filling machine comprising a valve chamber provided with a valve seat, a valve engaging the valve seat, an inlet pipe rigidly connected with the valve and passing through the wall of the valve chamber, and means connected with the inlet pipe for pressing the valve against the valve seat.

12. In a bottle-filling machine, a movable drainage pan provided with an outlet, a normally-closed valve controlling the outlet, a fixed drainage receptacle, and means for opening the valve when the outlet is in position to deliver into the drainage receptacle.

In testimony whereof I have affixed my signature in presence of two witnesses.

FREDERIC GEORGE RILEY.

Witnesses:
CHARLES R. RILEY,
WILLIAM HENRY VERNON.